United States Patent Office 3,459,711
Patented Aug. 5, 1969

3,459,711
MANUFACTURE OF LINEAR FIBER-FORMING POLYESTERS
Adolf Hartmann, Gessertshausen, and Peter Schweizer, Augsburg, Germany, assignors to Farbwerke Hoechst Aktiengesellschaft vormals Meister Lucius & Bruning, Frankfurt am Main, Germany, a corporation of Germany
No Drawing. Filed Nov. 18, 1966, Ser. No. 595,345
Claims priority, application Germany, Nov. 24, 1965,
F 47,750
Int. Cl. C08g 17/015
U.S. Cl. 260—75      5 Claims

ABSTRACT OF THE DISCLOSURE

A process for the manufacture of linear polyesters of aromatic dicarboxylic acids by melt condensation of di-glycol esters of dicarboxylic acids in the presence of a germanium compound containing oxygen and phosphorus.

---

The present invention relates to a process for the manufacture of linear fiber-forming polyesters, especially to an improvement in the melt condensation of the di-glycol esters of dicarboxylic acids in the presence of a catalyst.

Linear polyesters, especially those of aromatic dicarboxylic acids, have gained increasing importance in industry for the manufacture of fibers, filaments or films. These polyesters are generally obtained by the polycondensation of diesters of dicarboxylic acids with dihydric aliphatic or cycloaliphatic glycols, especially with ethylene glycol or 1.4-dimethylol cyclohexane. In the absence of a catalyst, the reaction proceeds too slowly as regards technical requirements and gives insufficient yields. Numerous proposals have, therefore, been made to overcome this drawback by adding suitable compounds having a catalytic effect. Metals, metal oxides or selected metal compounds, for example of antimony, tin, lead or titanium have gained the greatest importance. However, a great number of other metals or metal compounds have become known as catalysts, for example those of bismuth, lanthanum, gallium and germanium. Of the latter compound, there have especially been used the metal and the oxide as well as halides and simple organic compounds, such as tetraethylate.

In spite of this great number of technically useful catalysts the results obtained therewith are not yet satisfactory in every respect. Thus there are noticed undesirable disclororations of the polyester material in many cases in the course of the polycondensation or in the work-up following thereafter, discolorations which are due to an insufficient thermal stability of the products. In order to avoid these disadvantages which weigh heavily in practical application, there have often to be applied special measures, for example the addition of stabilizers. As such, there have proved to be useful especially the compounds of phosphorus, of which triphenyl phosphite and phosphorous acid are the best known compounds. On the one hand, the thermal stability and the brightness of color of the polyesters are improved by these additives, but on the other hand there have often to be tolerated undesirable reduction phenomena which occur especially with the use of antimony as a catalyst. With the use of the aforesaid germanium compounds which do not in general display such phenomena it is, on the other hand, disadvantageous that the solubility of the metal and the oxide in the reaction mass is insufficient so that the condensation period required for carrying out the process on an industrial scale is too long. The halides and organic germanium compounds, in their turn, are so highly volatile that they cannot be used as catalysts in view of the high reaction temperatures applied.

Now we have found in a process for the manufacture of linear fiber-forming polyesters of aromatic dicarboxylic acids having not more than two aromatic nuclei or mixtures of these dicarboxylic acids containing up to 20 mole percent of aliphatic and/or cycloaliphatic dicarboxylic acids with 6 to 10 carbon atoms and aliphatic and/or cycloaliphatic glycols containing 2 to 8 carbon atoms by melt condensation of the di-glycol esters of the dicarboxylic acids in the presence of a catalyst, the improvement of carrying out the melt condensation in the presence of a germanium compound containing oxygen and phosphorus.

The germanium compounds containing oxygen and phosphorus as used in the process of the present invention are all the compounds of germanium containing the oxygen acids of phosphorus, such as germanium phosphite, germanium phosphate, germanium hypophosphite, as well as the complex compounds containing germanium alone or in addition to other metals. Such compounds are obtained, for example, by reacting germanium dioxide with hydrochloric acid and adding hypophosphoric acid, or by reacting germanium dioxide with a sodium hydroxide solution, acidifying with acetic acid, adding phosphoric acid and manganese acetate. In the compounds used according to the invention, the germanium may be present in the bivalent and in the tetravalent state. Germanium phosphite is preferably used, especially in an amount which corresponds to $2.0 \cdot 10^{-4}$ to $2.5 \cdot 10^{-4}$ gram atoms of germanium per mole of dicarboxylic acid.

It is known that germanium dioxide can also be applied in the presence of phosphoric acids. In this case, however, the aforementioned difficult solubility of germanium dioxide in the recation mass is hardly improved, the addition of two ingredients is disadvantageous and the decrease of the polycondensation degree in the work-up of the raw materials is too considerable. Moreover, it is known that phosphoric acids, especially those of a low valency stage, are extremely hygroscopic and, for this reason, difficult to handle while the phosphorus compounds of germanium according to the present invention are entirely stable in the air and, for this reason, withstand storage and can easily be handled.

The diesters, which are used as starting materials for the polycondensation according to the process of the present invention, are prepared in known manner from aromatic dicarboxylic acids and aliphatic and/or cycloaliphatic glycols. Several methods are known therefor, but generally there are used as starting materials the diesters of acids with low-molecular weight alcohols, especially with methanol, which are re-esterified with the glycols to be used in a reaction stage preceding the polycondensation. By increasing the temperature, the low molecular weight alcohols are removed from the equilibrium bp distillation. In the process of re-esterification, certain types of catalysts are used, for example the acetates of zinc, manganese or cobalt. However, apart from using the method of re-esterification, the di-glycol esters of aromatic dicarboxylic acids may also be obtained by esterifying the free acids with the glycols with the splitting off of water or by applying cyclic carbonates or oxides; the latter method is used especially for the preparation of ethylene glycol esters.

Aromatic dicarboxylic acids, which may be used for the preparation of polyesters according to the process of the present invention are, for example, in addition to the preferred terephthalic acid, isophthalic acid, 2,6-naphthalene dicarboxylic acid, 4,4'-diphenyl dicarboxylic acid, sulfonyl dibenzoic acid. These acids, or the esters thereof with low molecular weight alcohols, may be used alone or in admixture with one another. It is also possible to add aliphatic or cycloaliphatic dicarboxylic acids or the esters with low molecular weight alcohols thereof to the reaction mixture in minor amounts not exceeding 20 mole percent, calculated on the aromatic dicarboxylic acids, for example, adipic acid, sebacic acid, hexahydroterephthalic acid or 1,2-cyclobutane dicarboxylic acid. As glycols there may be used, in addition to the preferred ethylene glycol, tri- and tetramethylene glycol, for example also 1,3-propanediol, 1,4-butanediol, 2,2-dimethylpropanediol-1,3, 1,2-dimethylol cyclobutane or 1,4-dimethylol cyclohexane. Acids as well as glycols may also contain other groups, provided that the polyester condensation is not disturbed thereby. Groups of this type are, for example, methoxyl-, ethoxyl-, sulfonyl groups or groups of alkali metal sulfonate.

The polycondensation is carried out in known manner. After the addition of the germanium compound to be used as a catalyst according to the process of the present invention, preferably in an amount which corresponds to $10^{-3}$ to $10^{-5}$ gram atoms of germanium per mole of the dicarboxylic acid dimethyl ester used as starting material, the temperature of the reaction mass is slowly raised to approximately 275° C., with agitation and with the exclusion of air, while the pressure is released to values below 1 mm. of mercury, and the melt is maintained under these conditions for 2 to 4 hours. It is not necessary to add stabilizers or optical brighteners, but they may be added if desirable. In many cases the reaction period can be shortened considerably as compared with the known processes, for example as compared with the use of antimony trioxide. After the termination of the reaction, the mass is quenched in cold water and comminuted, as usual.

It is especially advantageous to use the novel catalysts in the continuous preparation of polyesters on account of the high activity and simple dosability thereof.

The condensation products obtained according to the process of the present invention are entirely colorless and crystal clear. Since there does not occur any gray discoloration whatever, the products are distinguished by an especially intense brightness of color. The values attainable for the relative viscosity of the products (measured in a solution of 1 percent strength by weight in chlorophenol at 25° C.) are situated at 1.8 to 2.0; their melting points correspond to the temperature degrees which are also observed with the use of other catalysts in each respective case.

The polyesters prepared according to the process of the present invention, especially polyethylene terephthalate, can be worked up in an unobjectionable manner; for example, they can be spun from extruders into drawable filaments, in which case there is observed only a slight degradation. The quality of the final products is excellent as regards the degree of whiteness; in respect of the other properties, sursh as tensile strength and utility, the quality corresponds to the conventional standards.

The following examples serve to illustrate the invention, but they are not intended to limit it thereto:

Example 1

A mixture composed of 1200 grams dimethyl terephthalate, 880 grams ethylene glycol and 0.276 gram manganese acetate was heated in an atmosphere of nitrogen to a temperature within the range of from 160° to 220° C. during the course of 4 hours, while methanol distilled off. After the addition of 0.360 gram germanium phosphite, the temperature was raised to 264° C. during the course of 90 minutes, with agitation, in order to remove the ethylene glycol in excess, the pressure was then released to 0.6 mm. Hg while the temperature was raised simultaneously to 275° C. during the course of about 30 minutes. The melt was slowly stirred under these conditions for 2½ hours, while the pressure decreased to 0.2 mm. Hg. From the current consumption of the stirring motor there was noticeable a considerable increase in the melt viscosity. The melt was then discharged into cold water. A crystal clear, colorless condensation product was obtained which had a relative viscosity of 1,850 and a melting point of 259° to 260° C. At a temperature of 280° C., the product could be spun into filaments in the extruder in an unobjectionable manner. The filaments were drawn in a ratio of 1:4.5 and then possessed a high tensile strength. Their degree of whiteness was excellent, without any yellow or gray discoloration. The value of the relative viscosity was 1,824.

Example 2

Dimethyl terephthalate was reesterified with ethylene glycol according to the process as described in Example 1 except that instead of manganese acetate 0.300 gram cobaltous acetate was used. After the reaction was complete, 0.480 gram germanium phosphite was added while proceeding otherwise as described in Example 1. The condensation product obtained was crystal clear and had a slightly bluish color. Its melting point was 257° C., the value of the relative viscosity was 1,868. Upon being spun in the extruder, the condensation product yielded filaments which, after being drawn in a ratio of 1:4.3, possessed a high tensile strength and were distinguished by a whiteness of an especially intense brilliancy. The degradation was negligible, the value of the relative viscosity of the filaments was 1.815.

Example 3

After the addition of 0.025 gram of germanium phosphite, 50 grams diethylene glycol terephthalate were heated in a condensation vessel to 275° C. in an atmosphere of nitrogen. When the reactants were present in the form of a melt, the pressure was released in the course of 30 minutes to 0.3 mm. Hg, with agitation, and the reaction mass was maintained under these conditions for another hour. Then the melt was discharged into water. A colorless, crystal clear polycondensation product was obtained which had a melting point of 261° C. and a relative viscosity of 1,627, which could be spun into filaments which could be drawn in an unobjectionable manner.

Example 4

0.312 gram germanium hypophosphite was added to a reaction mixture that had been reesterified according to the method described in Example 1. This reaction mixture was polycondensed in the manner described in that example except that the polycondensation lasted 3.5 hours.

The polyester obtained corresponded in regard of aspect and properties to the product obtained according to Example 1 (melting point 259° C.; relative viscosity 1,870).

Example 5

48.8 grams 2,6-naphthalene-dicarboxylic acid diethyl ester, 31.0 grams ethylene glycol and 0.0146 gram manganese acetate were heated for 6 hours in an atmosphere of nitrogen at a temperature within the range of from 180° to 230° C. After the calculated amounts of methanol had distilled off, 0.0244 gram germanium phosphite was added and the reaction mixture was slowly heated to 275° C., with agitation, in which process the ethylene glycol in excess was removed. The pressure was released to 0.4 mm. Hg and the reaction mass was maintained under these conditions for 3 hours.

The melt which was discharged into water solidified into a colorless product having a melting point of 265° C.; the value of the relative viscosity amounted to 1,750.

Example 6

0.009 gram manganese acetate was added to a mixture comprising 40 grams dimethyl terephthalate, 32 grams ethylene glycol and 1.6 grams sebacic acid diethyl ester. In an atmosphere of nitrogen, the mixture was heated for 90 minutes while the temperature was raised from 180° to 230° C. In this process, methanol distilled off at the descending condenser. Then 0.02 gram germanium phosphite was added, with agitation, the pressure was released to 0.2 mm. Hg in the course of 75 minutes while the temperature was simultaneously raised to 275° C. After a further 90 minutes, during the course of which the pressure and temperature was maintained constant as indicated above, a colorless condensation product was obtained which, on being discharged into water, solidified to yield a crystal clear product. Its value of relative viscosity was 1,568, its melting point was 254° C. Drawable filaments could be spun from this copolyester.

Example 7

40 grams diethyl terephthalate were heated with 32 grams ethylene glycol and 0.0092 gram manganese acetate in an atmosphere of nitrogen for 2 hours to a temperature within the range of from 180° to 230° C., while the calculated amount of methanol distilled off. 4 grams dimethyl terephthalate were reesterified in the same manner with 7.43 grams 1,4-dimethylol cyclohexane with the use of 0.92 mg. manganese acetate.

The two reaction products obtained were combined and 0.022 gram germanium phosphite was added to the mixture. During the course of 45 minutes, the temperature was raised from 200° to 275° C., with agitation, and the pressure was released to 0.1 mm. Hg.

After two hours condensation, the melt was solidified by discharging it into cold water whereby a clear condensation product was obtained which had a melting point of 212° C. and a relative viscosity of 1,707. The filaments made from the product could be drawn in an unobjectionable manner.

Example 8

0.5 gram germanium dioxide was dissolved in 4.5 cc. of 6 N hydrochloric acid, 2.5 cc. of hypophosphoric acid of 50% strength by weight were added and the whole was heated under reflux for 30 minutes. After the mixture had been left for 12 hours, a compound consisting of stoichiometric amounts of gernanium hypophosphite and germanium(II)-chloride had separated in a cristalline form. The precipitate was washed with dilute hypophosphoric acid and then with absolute alcohol and ether, and dried. After 500 grams dimethyl terephthalate had been reesterified with 400 grams ethylene glycol with the addition of 0.115 gram manganese acetate (heating in an atmosphere of nitrogen to a temperature within the range of from 180° to 220° C. and distilling off the methanol formed), 0.150 gram of the germanium compound described above was added to the reaction mixture thus obtained, and the temperature was raised from 220° to 275° C. during the course of 2 hours. In this process, the mass was stirred in a uniform manner and the ethylene glycol in excess removed by distillation. At the temperature indicated above, the pressure was released to 0.4 mm. Hg and the reaction mass was maintained under these conditions for a further 5 hours, while the pressure decreased to 0.18 mm. Hg. When the melt was discharged into cold water, a colorless, crystal clear polyethylene terephthalate was obtained that had a melting point of 259.5° C. and a relative viscosity of 1,664.

Example 9

1.0 gram germanium dioxide was dissolved in a quantity that was just sufficient of a sodium hydroxide solution of 20% strength by weight, the solution was acidified to a small degree with acetic acid and 8.2 grams phospheric acid were added thereto. Then 1.73 grams manganese acetate, dissolved in a small amount of acetic acid, were introduced into the reaction mixture and the whole was boiled during a short period, with agitation. The microcristalline deposit that had precipitated was then filtered off with suction, washed with alcohol and dried. 0.25 gram of this compound was added to 500 grams diethylene glycol terephthalate and the mixture was heated during the course of 2 hours to 275° C., with agitation. After the pressure had been released to 0.3 mm. Hg, the melt was polycondensed under the conditions indicated above over a period of 4.5 hours and then discharged into cold water. A crystal clear, colorless condensation product was obtained that had a melting point of 260° C. and a relative viscosity of 1,734 which could be spun into drawable filaments in an unobjectable manner.

We claim:
1. In the process for the manufacture of linear fiber-forming polyesters of (1) aromatic dicarboxylic acids having not more than two aromatic nuclei of mixtures of said aromatic dicarboxylic acids with up to 20 mole percent of aliphatic dicarboxylic acids, cycloaliphatic dicarboxylic acids or mixtures thereof, said aliphatic or cycloaliphatic dicarboxylic acids having 6 to 10 carbon atoms and (2) aliphatic glycols, cycloaliphatic glycols or mixtures thereof said gylcols having 2 to 8 carbon atoms by melt condensation of the di-gylcol esters of the dicarboxylic acids in the presence of a catalyst, the improvement comprising carrying out the melt condensation in the presence of a catalytically effective amount of a catalyst comprising at least one germanium compound containing oxygen and phosphorus selected from the group consisting of germanium phosphite, germanium phosphate, germanium hypophosphite, a compound formed by reacting germanium dioxide with hydrochloric acid and hypophosphoric acid or a compound formed by reacting germanium dioxide with sodium hydroxide, acidifying with acetic acid and adding phospheric acid and manganese acetate.

2. The process according to claim 1 wherein the catalyst is germanium phosphite.

3. The process according to claim 1 wherein the catalyst is present in an amount which corresponds to $10^{-3}$ to $10^{-5}$ gram atoms of germanium per mole of dicarboxylic acid.

4. The process according to claim 1 where in the catalyst is germanium phosphite in an amount which corresponds to $2.0 \cdot 10^{-4}$ to $2.5 \cdot 10^{-4}$ gram atoms in germamium per mole of dicarboxylic acid.

5. The process according to claim 1 where in the catalyst is germanium phosphite, germanium phosphate or germanium hypophosphite.

References Cited

UNITED STATES PATENTS 2,951,060  8/1960  Billica _____ 260—75
2,974,122  3/1961  Lincoln et al.

WILLIAM H. SHORT, Primary Examiner

L. P. QUAST, Assistant Examiner

U.S. Cl. X.R.

23—85, 105; 252—437; 260—429